April 14, 1970  E. S. CISCO  3,505,962
VEHICLE HAVING CONVERTIBLE FLOOR STRUCTURE AND LATCH
Filed Jan. 3, 1966  3 Sheets-Sheet 3
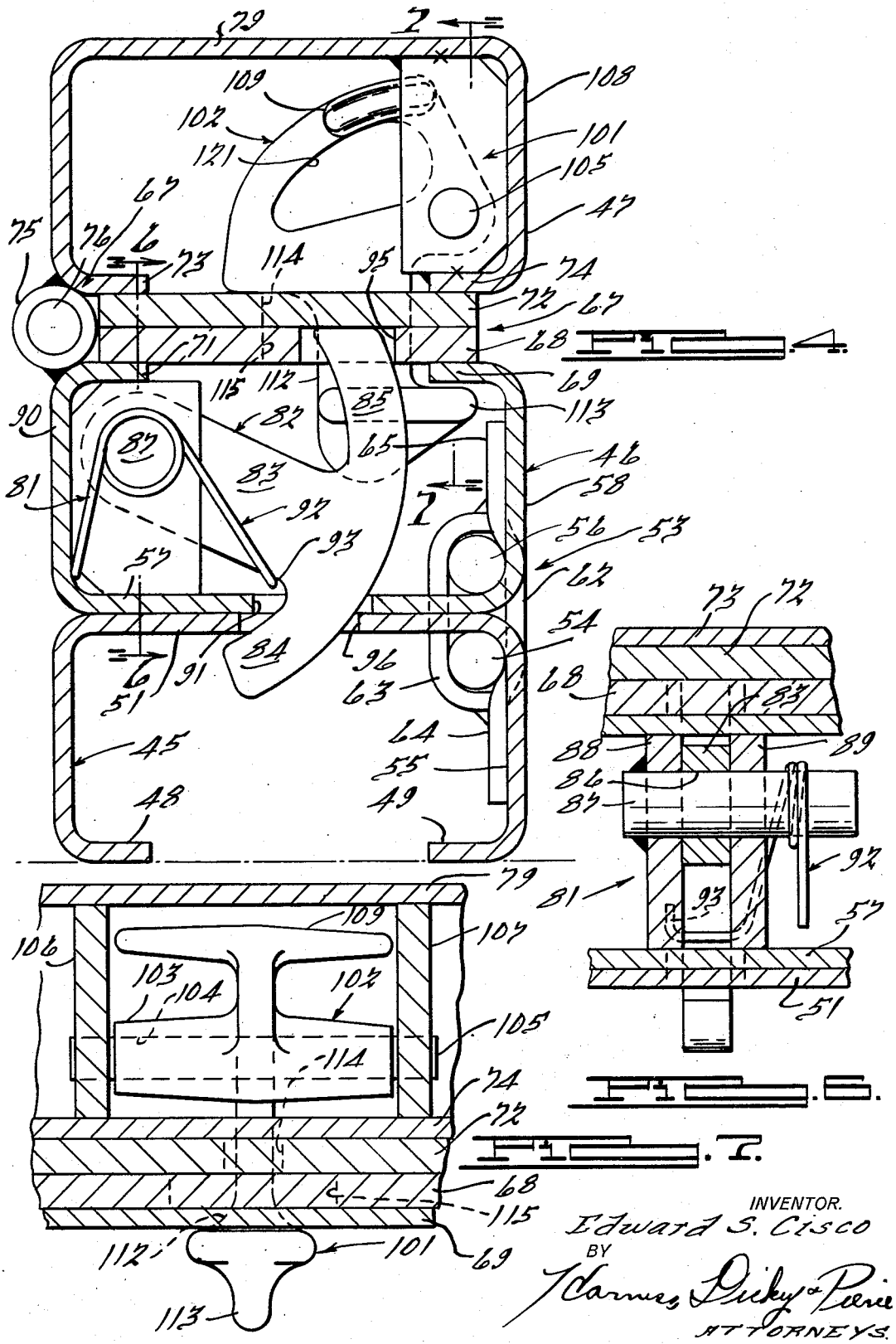
INVENTOR.
Edward S. Cisco
BY
Harness, Dickey & Pierce
ATTORNEYS United States Patent Office 3,505,962
Patented Apr. 14, 1970

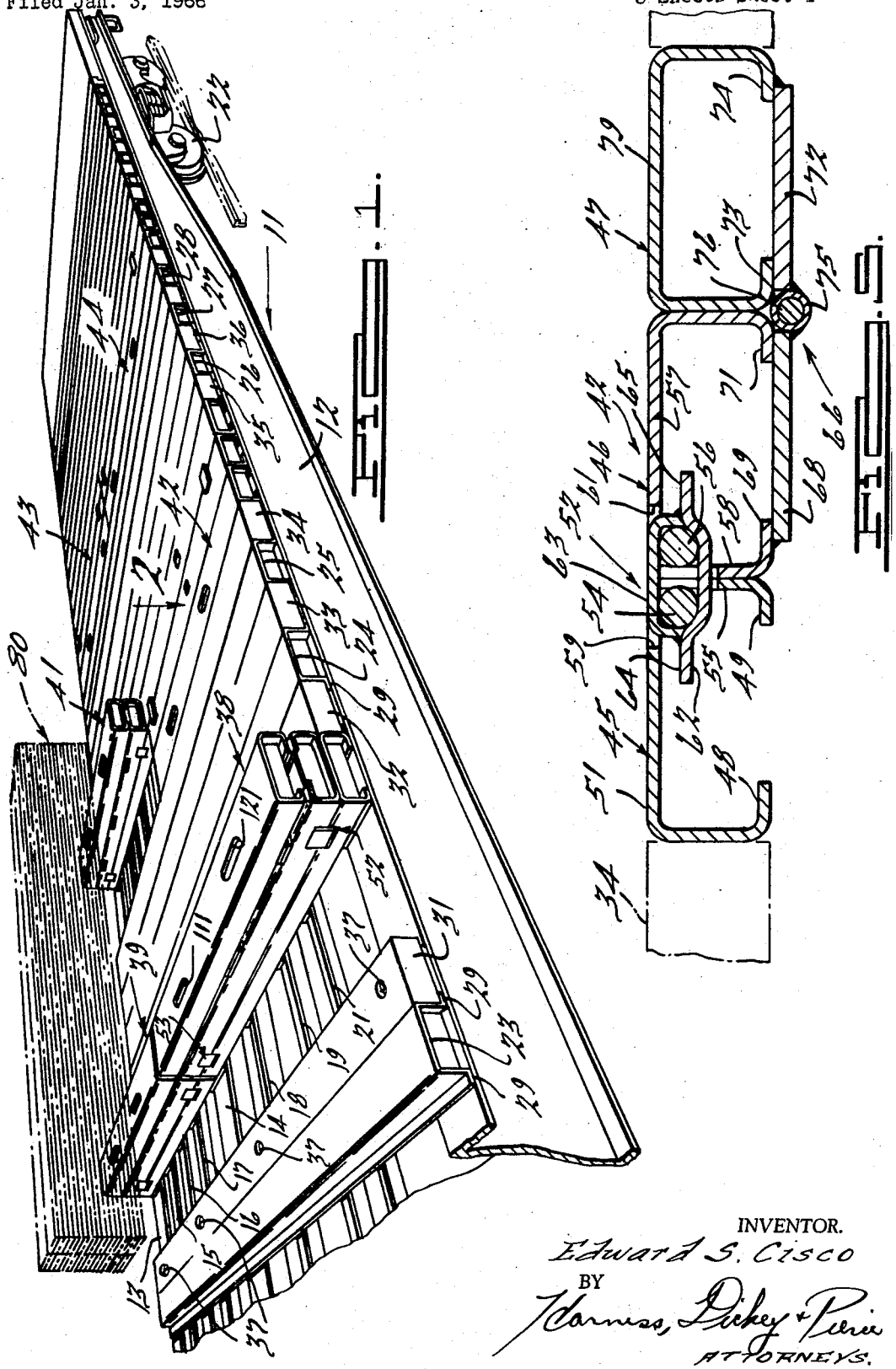

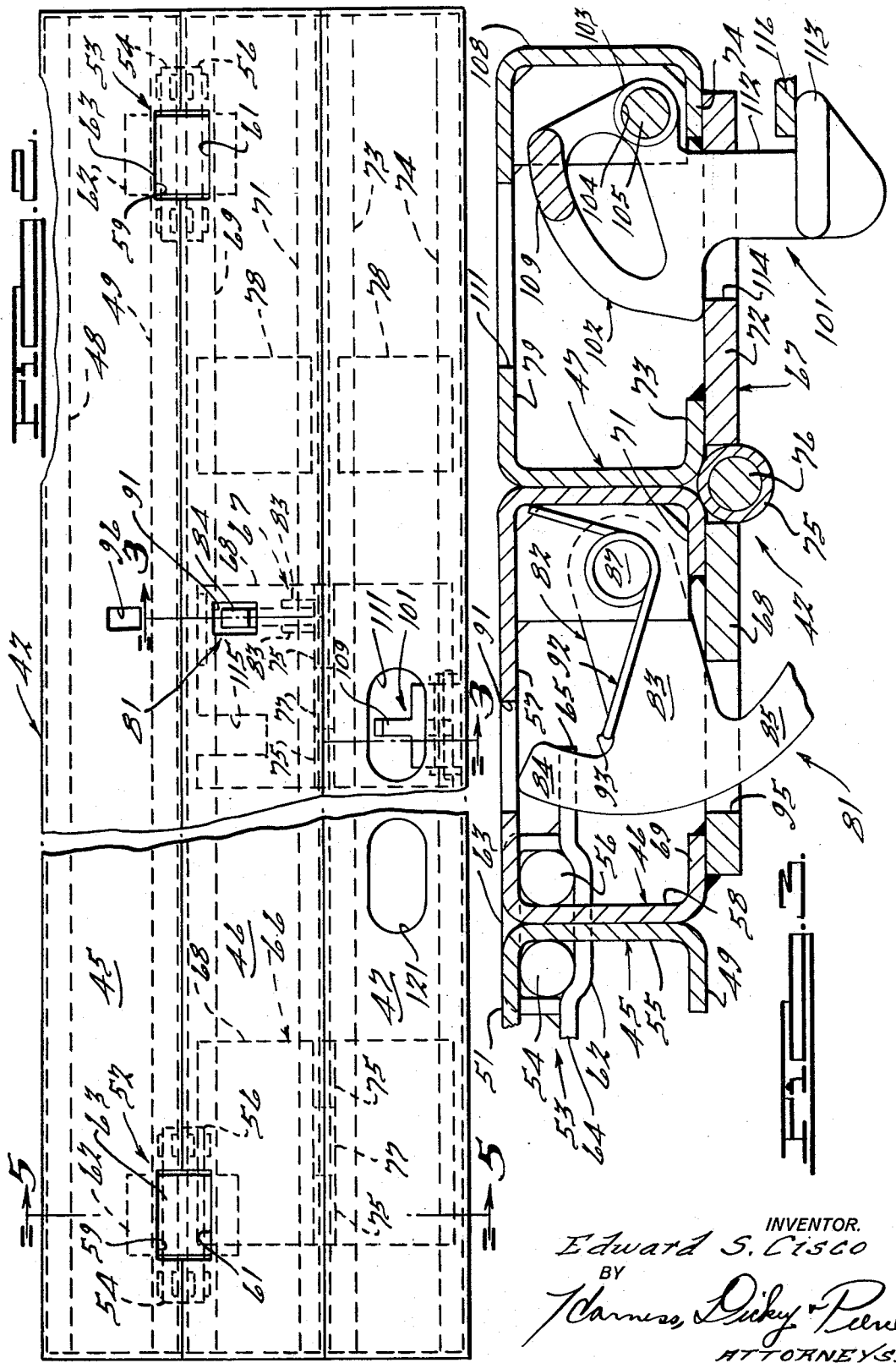

3,505,962
VEHICLE HAVING CONVERTIBLE FLOOR
STRUCTURE AND LATCH
Edward S. Cisco, Livonia, Mich., assignor to Evans
Products Company, a corporation of Delaware
Filed Jan. 3, 1966, Ser. No. 518,203
Int. Cl. B60p 7/08; B61d 3/04
U.S. Cl. 105—422                                6 Claims

ABSTRACT OF THE DISCLOSURE

A railway flat car embodying a convertible floor structure. The floor structure is made up of spaced units that are movable from a first position wherein they define a substantially planar floor surface along the length of the car to an elevated position wherein they provide spaced elevated supports. One of the units carries a locking structure that is operative to lock the floor structure in at least one of its operative positions.

---

This invention relates to a railway car and more particularly to a convertible floor structure for a railway car or the like that adapts the car to the transportation of various types of loads.

Flat bedded vehicles such as railway flat cars are employed to transport a wide variety of articles. With certain types of transported articles it is desirable to stack the articles upon risers in the form of wood planks or the like so that the load will be supported at a spaced distance above the vehicle floor. This method of loading permits the articles to be moved onto or off of the car by means of a fork truck, the forks of which slide into the space between the load and the vehicle floor.

The use of separate risers for elevating the load has several disadvantages. If the risers are separate elements, they can easily become lost when the vehicle is being transported in an empty condition and it is difficult to correctly position the risers. The aforementioned defect can readily be cured by fixing the risers in position upon the vehicle floor, however, this destroys the usefulness of the floor and vehicle for hauling other loads that either do not require elevation or can not be carried in such a manner.

It is, therefore, the principal object of this invention to provide a railway car floor structure that permits ready conversion of the car to hauling different types of loads.

It is a further object of this invention to provide a convertible floor structure for a load carrying vehicle that may be used to support loads in an elevated position or in a non-elevated carrying position.

A convertible floor structure for a freight carrying vehicle embodying this invention adapts the vehicle to the transportation of a variety of articles. The floor structure comprises means adapted to form at least in part a floor surface and means for supporting the floor structure means for movement relative to the vehicle between first and second operative positions. The floor structure means is disposed to provide a substantially planar floor surface in the first operative position for supporting articles requiring such a supporting surface. The floor structure is disposed to provide an elevated, localized supporting surface in its second operative position for elevated support for articles and to provide an access area below the articles.

As a further feature of the invention, the floor structure means comprises at least two floor members supported for relative movement and including means for locking the floor members in at least one position relative to each other. The locking member is pivotally supported by one of the floor members and has projections that are adapted to extend beyond opposite sides of the one floor member. The other floor member has aperture means for lockingly receiving at least one of the locking member projections when the floor members are in one of their operative positions. Means are provided for engaging the opposite projection means of the locking member and urging the first projection into the aperture means.

Other objects and advantages of this invention will become more apparent as this description proceeds, particularly when considered in conjunction with the accompanying drawings, wherein:

FIGURE 1 is a partial perspective view of a railway flat car embodying this invention;

FIGURE 2 is an enlarged top plan view looking in the direction of the arrow 2 in FIGURE 1;

FIGURE 3 is an enlarged cross-sectional view taken along the line 3—3 of FIGURE 2;

FIGURE 4 is an enlarged cross-sectional view, in part similar to FIGURE 3, showing the floor structure in another position;

FIGURE 5 is a cross-sectional view taken along the line 5—5 of FIGURE 2 on a somewhat larger scale;

FIGURE 6 is a cross-sectional view taken along the line 6—6 of FIGURE 4; and

FIGURE 7 is a cross-sectional view taken along the line 7—7 of FIGURE 4.

Referring now in detail to the drawings and in particular to FIGURE 1, a flat bed, multi-purpose railway car embodying this invention is shown partially and is identified generally by the reference numeral 11. It is to be understood that, although this invention is described in conjunction with a railway car, it is susceptible for use in other freight transporting vehicles or may, in fact, be used in warehouses. The underframe construction of the railway car 11 may be considered to be conventional and is comprised in part of generally channel shaped side sills 12 and 13, a built-up center sill structure 14, and longitudinally extending car stringers 15, 16, 17, 18, 19 and 21. Trucks 22 support one end of the railyway car 11 and similar truck (not shown) are provided at the other end of the car 11.

Fixedly supported upon the upper surface of the car frame and extending transversely to the side sills 12 and 13, center sill 14 and stringers 15 through 21, are a plurality of inverted hat-shaped structural steel members 23, 24, 25, 26, 27 and 28, etc. Supported above the outstanding flanges 29 of each of the hat-shaped members 23 through 28, are a plurality of transversely extending lumber pieces 31, 32, 33, 34, 35, 36, etc. The lumber pieces are fixed relative to the car frame by means of bolts and nuts (not shown) that extend through apertures 37 formed in each of the lumber pieces at transversely spaced locations. The upper surface of the lumber pieces and the top surfaces of the hat-shaped members lie in substantially the same plane so as to provide a fixed planar floor surface.

It will be noted that gaps exist between pairs of the lumber members, for example, between the members 31 and 32. These gaps are filled by a plurality of convertible car floor structures, indicated generally by the reference numerals 38, 39, 41, 42, 43 and 44. Each transversely extending gap is filled by a pair of the convertible car floor structures. The use of two such structures in a given transverse gap, each extending half the width of the car, permits greater versatility for the car usage and also permits the floor structure to be moved between its operative positions by a single workman.

Since each of the convertible car structures 38 through 44 are substantially the same, only one will be described in detail, reference now being had to the remaining figures. The convertible floor structure is comprised of three generally like shaped elongated floor members 45, 46 and 47. The floor members 45 through 47 are depicted as being formed from steel channels, however, other materials such as lumber pieces or the like may be used.

The floor member 45 has a pair of inwardly extending relatively short flanges 48 and 49 formed at the base of its channel shape, which flanges are affixed, as by welding to the car structure. The upper surface of the web 51 of the floor member 45 lies substantially in the same plane as the upper surface of the adjacent, fixed lumber floor member 34.

A first pair of hinge assemblies 52 and 53 pivotally connect the floor members 45 and 46 with respect to each other at their adjacent upper edges when viewed in the extended position. Each of the hinge assemblies 52 and 53 is identical and comprises a first pivot pin 54 that is affixed, as by welding, at each of its ends to the floor member 45 adjacent the juncture between the web 51 and a short leg 55, that is adjacent to the floor member 46 when the floor members are in their extended position. A second pivot pin 56 is affixed, as by welding, at each of its ends to the floor member 46 at the juncture between the web 57 and a short leg 58 which is adjacent to the short leg 55 of the floor member 45 in the extended position of the floor assembly. Cutouts 59 and 61 (FIGURE 5) are formed adjacent the pins 54 and 56 in the respective legs of the floor members 45 and 46. The cutouts are shorter in length than the pivot pins 54 and 56 (FIGURE 2).

Each hinge assembly is completed by a first strap or plate 62 and a second strap or plate 63 that are welded together to form a generally rectangular cavity in which the pivot pins 54 and 56 are received. The opposite sides of the pivot pins 54 and 56, however, are snugly engaged by the plate members 62 and 63 which are not otherwise fixed to either of the floor members 45 and 46. The plate 62 also is longer and formed with a pair of extending legs 64 and 65.

A second pair of hinge assemblies, indicated generally by the reference numerals 66 and 67 pivotally connect the floor members 46 and 47 contiguous to their adjacent lower ends when viewed in the extended position. Each of the hinge assemblies 66 and 67 is substantially the same, except as will be noted, and comprises a first leaf 68 that extends across the lower inturned flanges 69 and 71 of the floor member 46 and is affixed thereto, as by welding. A similar leaf 72 is affixed by welding to lower inturned flanges 73 and 74 of the floor member 47. A pair of spaced bushing members 75 are fixed, as by welding, to the leaf 68 and receive a hinge pin 76, the ends of which are affixed after assembly by a tack welding to the bushing member 75. A bushing member 77 is affixed by welding to the leaf 72 between the bushings 75 to journal the hinge pin 76 after assembly. A pair of spacer plates 78 are welded to the underside of the floor members 46 and 47 at a spaced location from the hinge assemblies 66 and 67. Each of the plates 78 has a thickness corresponding to the thickness of the hinge leaves 68 and 72 so as to provide support along the length of the floor members 46 and 47 when they are in their stacked position, as will become more apparent as this description proceeds.

Each of the convertible car floor assemblies 38 through 44 is movable from a first operative position wherein the upper surfaces of the floor members 45, 46 and 47 define a substantially planar surface that lies in the same plane as the fixed portion of the floor of the railway car 11. The convertible car floor assemblies 42, 43 and 44 are depicted in this position. In such a position a substantial area of the floor of the railway car 11 is flat or substantially so whereby loads requiring such a supporting surface may be carried upon the floor or portions of it in this position. In the other operative position, which is the stacked position as shown in FIGURE 1 by the position assumed by the floor assemblies 38, 39 and 41 and the position shown in FIGURE 4, certain loads may be carried at a spaced location above the floor. Thus the web 79 of the floor member 47 defines an elevated supporting surface and adjacent pairs of the floor assemblies may be elevated so that certain types of loads, for example, stacks of lumber as indicated generally by the reference numeral 80, may be supported thereupon. The elevated supporting position provided by the stacked floor assemblies 39 and 41 elevates the lumber 80 above the remainder of the car floor so that the forks of a fork truck or other similar device may pass beneath the lumber stack 80 for loading and unloading.

Although various types of folding arrangements may be used to swing each of the convertible car floors from their extended to their stacked position, in one method of operation the floor members 46 and 47 are swung as a unit about a pivot axis defined by the pivot pins 54 of the hinge assemblies 52 and 53. After the floor members 46 and 47 are swung into a vertical position, the floor members 46 and 47 combine to be swung as a unit but now about the pivot axis defined by the pivot pins 56 until the floor member 46 lies with its web 57 resting upon the web 51 of the fixed floor member 45. In this position (FIGURE 4) the hinge assemblies 52 and 53 interconnecting the floor members 45 and 46 move to bring the plate 62 rather than the plate 63 into registry with the opening provided by the cutouts 59 and 61. Its legs 64 and 65 then engage the adjacent surfaces of the floor members 45 and 46. Thus, the members 63 and 62 fill the gap left by the cutouts 59 and 61 regardless of the respective positions of the floor members 45 and 46.

When the floor members 46 and 45 are stacked upon each other, the floor member 47 is swung about the pivot pin 76 of the hinge assemblies 66 and 67 to bring the hinge leaves 68 and 72 into contact so that the floor member 47 is stacked upon and supported by the floor member 46. Thus, the floor members may be conveniently and readily moved between their stacked and extended positions to provide two operative positions for each of the floor assemblies. In the stacked position elevating supporting surfaces are provided by the webs 79 of the floor members 47 and in the extended position a substantially planar floor surface is provided by the webs 51, 57 and 79 of the floor members 45, 46 and 47, respectively. In the stacked position, the contact between the plates 78 provides support between the floor members 46 and 47 at the location spaced from the hinge assemblies 66 and 67 so that support will be provided at spaced intervals along the length of each floor assembly in all positions.

A latch mechanism, indicated generally by the reference numeral 81 and shown in more detail in FIGURES 3, 4 and 6, is provided to retain the floor members 45 and 46 in their stacked relationship. The latch mechanism 81 comprises a locking member 82 having a radially extending arm 83 that terminates at one end in a short arcuate hook portion 84 and a long arcuate hook portion 85 that extend from opposite sides of the arm 83. The arm 83 has a cylindrical bore 86 at the end opposite the hook portions 84 and 85 that is journaled upon a pivot pin 87. The pivot pin 87 is affixed, as by welding, to a pair of spaced support plates 88 and 89 that slidingly engage opposite sides of the arm 83. The support plates 88 and 89 are affixed, as by welding, to the interior of the floor member 46 in the space between its web, a short leg 90 and flange 71.

The long arcuate hook portion 85 is adapted to extend through the space between the flanges 69 and 71 and the short hook portion 84 is adapted to extend through a rectangular aperture 91 formed in the web 57. A mousetrap spring 92 is wrapped around an extending end of the pivot pin 87 and has a hooked end portion 93 that engages the arm 83 adjacent its hooked portion 84. The mousetrap spring 92 exerts a rotational force upon the locking member 82 tending to force the long hook portion 85 through the space between the flanges 69 and 71.

When the convertible car floor assemblies are in their extended position (FIGURE 3), the mousetrap spring 92 urges the locking member 82 in a direction so that the long hook portion 85 extends through the aperture provided by the flanges 69 and 71 and through a rectangular aperture 95 formed in the leaf 68 of the hinge assembly 67. In this position, the short hook portion 84 lies below the upper surface of the web 57 of the floor member 46 and below the aperture 91.

When the convertible car floor assembly is swung to its stacked position (FIGURE 4), the leaf 72 of the strap hinge assembly 67 will contact the outer end of the long hook portion 85 and rotate the locking member 82 in a clockwise direction as viewed in FIGURE 4 above the supporting pivot pin 87. The shorter arcuate arm portion 84 will then be urged through the aperture 91 in the floor member 46 and will be received in a corresponding aperture 96 formed in the web 51 of the fixed floor member 45. Thus, the floor members 45 and 46 will be locked together automatically upon the stacking of the floor member 47 upon the floor member 46.

A lock mechanism indicated generally by the reference numeral 101 is also provided to lock the floor members 46 and 47 in their stacked position. If desired, the lock mechanism 101 may also be employed to lock the floor members in the extended position. The lock mechanism 101, which is shown in more detail in FIGURES 3, 4 and 7, comprises a forging 102 having an elongated journal 103 in which a cylindrical bore 104 is formed. The forging 102 is pivotally supported upon a pivot pin 105 that extends through the cylindrical bore 104 and is fixed, as by welding, at each of its ends to a pair of support plates 106 and 107 which span the forging portion 103. The plates 106 and 107 are wielded into the floor member 47 between its flange 74 and web 79 adjacent a short leg 108.

The forging has an integral operating handle 109 formed at its upper end that is accessible through an access opening 111 formed in the web 79 of the floor member 47. The access opening 111 also is wide enough to form an opening through which an operator's hand may be extended for movement of the floor assembly, as will become more apparent. Depending integrally from the journal portion 103 is a locking part 112 having offset hook 113. The locking part 112 depends through the space provided between the flanges 73 and 74 and through an aperture 114 formed in the leaf 72 of the strap hinge 67. In the stacked position (FIGURE 4) the hook portion 113 passes through an elongated rectangular aperture 115 formed in the leaf 68 of the strap hinge assembly 67 and lies under the flange 69 of the floor member 46 and is retained by gravity, or a spring if desired, in this position. Thus, the hook portion 113 precludes rotation of the floor members 46 and 47 relative to each other about the hinge pin 76 of the hinge assemblies 66 and 67. Therefore, the floor members 46, 47 and 45 are all locked relative to each other in a stacked position so that they will not be able to shake from this position.

The lock assembly 101, as has been noted, may also be employed to retain the convertible car floor assemblies in their extended position. In this position the hook portion 113 cooperates with a locking bar 116 that may be suitably affixed to any portion of the railway car understructure.

As has been noted, the opening 111 permits convenient grasping of the floor member 47 for moving the floor structures between their stacked and extended positions. A similar hand hole opening 121 may be provided adjacent the opening 111 so that a workman may grasp the floor structure with both hands. This permits convenient one-man operation of the floor structures which is also facilitated by their relatively short length with respect to the width of the railway car. The lock assembly 101 also can be released simultaneously with the grasping of the floor member 47 through the opening 111 for convenient operation. The lock assembly 101 also may be released through the use of a long handle hook member (not shown) that may be inserted through the opening 111 and engaged with an opening 121 provided in the forging 102. The latch mechanism 81 need not be engaged nor released since it is fully automatic in operation, as has been described.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A freight carrying vehicle including a convertible floor structure for adapting said vehicle to the transportation of a variety of articles, said floor structure comprising a first floor member fixed relative to the vehicle, a second floor member, and supporting means connecting said first floor member to said second floor member for movement of said second floor member relative to said first floor member from a side-by-side relationship providing a substantially planar floor surface in a first operative position for supporting articles requiring such a supporting surface to a stacked relationship with said second floor member being supported upon said first floor member to provide an elevated localized supporting surface in a second operative position for elevated support of articles and for providing an access area beneath articles supported upon said floor structure in its second operative position, a latching mechanism for locking said floor members in their stacked relationship, said latching mechanism comprising a latching member having a pair of arcuate portions, means for pivotally supporting said latching member within said second floor member, said second floor member having a pair of openings on opposite surfaces thereof through which a respective one of said arcuate portions is adapted to extend, means for biasing said latching member into a first position with one of said arcuate portions extending through one of said apertures, the other of said arcuate portions being adapted to extend through a corresponding aperture in said first floor member for engaging said floor member and locking said floor members with respect to each other, and means for urging said other arcuate portion through the aperture in said first floor member when said floor members are in their stacked relationship.

2. A freight carrying vehicle as set forth in claim 1 further including a third floor member connected to the second floor member for movement from a stacked relationship upon said second floor member to a side-by-side relationship with said second floor member, said third floor member being adapted to engage the one arcuate portion of the latching member and comprising the means for urging the other arcuate portion through the aperture in the first floor member.

3. A freight vehicle having an underframe and a floor extending the length of said underframe, said floor comprising a plurality of transversely extending floor board means fixed to said underframe in co-planar relationship with one another, said floor including at least one set of two lengthwise spaced floor board assemblies movable into and out of planar relationship with said fixed floor board means, each assembly providing two raised pivotally interconnected floor sections when moved out of said planar relationship for supporting with the other assembly lading in spanning relationship on the assemblies, and each floor assembly being separated by one of said fixed floor board means and accommodating the reception of the tines of a lift fork between the assemblies.

4. The invention as defined in claim 3 wherein said floor board sections includes a first floor board section pivotally mounted on said underframe for movement relative to said fixed floor board means, and a second floor board section pivotally connected to said first floor board section so as to be foldable relative thereto.

5. A vehicle having an underframe and having a floor extending the length of said underframe, said floor comprising a plurality of transversely extending floor board means fixed to said underframe in spaced apart co-planar relation, said floor including at least a pair of recesses and one set of two lengthwise spaced floor board assemblies each movable into and out of a respective recess and into and out of planar relationship with said fixed floor board means for supporting lading, said floor board assemblies each providing two raised floor sections for supporting lading in spanning relation thereon and each being separated from the other by said fixed floor board means to accommodate the tines of a lift fork therein, said floor board assemblies each including floor section support means in each recess between two of said fixed floor board means, said one floor board disposed on said support means within said recess, first means pivotally connecting said one floor board to said support means for pivotal movement from a horizontal position with said floor to a raised position extending above said fixed floor board means, said other floor board disposed on said support in said recess in side-by-side relation with said one floor board and another of said fixed floor board means, second means pivotally connecting the adjacent sides of said one floor board and the other floor board so that said other floor board is movable between a horizontal position within said recess to a raised position extending above said recess when said one floor board extends above said recess.

6. The invention according to claim 5 and said first means pivotally connecting said one floor board to said support means extending out of said recess for pivotal movement of said one floor board from a horizontal position with said floor to a horizontal position overlying one of said fixed floor board means, and said second means pivotally connecting the adjacent sides of said one and other floor boards being provided with means extendable out of said recess so that said other floor board is movable between a horizontal position within said recess to a horizontal position overlying said one floor board when the latter overlies the one fixed floor board means.

References Cited
UNITED STATES PATENTS

| | | | |
|---|---|---|---|
| 1,531,932 | 3/1925 | Haun | 105—375 |
| 1,531,933 | 3/1925 | Haun | 105—375 |
| 1,553,036 | 9/1925 | Foss | 108—112 |
| 1,864,956 | 6/1932 | Stone | 292—129 X |
| 2,428,144 | 9/1947 | Clough | 105—422 X |
| 2,594,940 | 4/1952 | Levine | 292—129 X |

ARTHUR L. LA POINT, Primary Examiner

R. A. BERTSCH, Assistant Examiner

U.S. Cl. X.R.

248—119